Dec. 18, 1962 E. F. STEINERT ETAL 3,069,614
POWER SUPPLY APPARATUS
Filed May 11, 1959 2 Sheets-Sheet 1

WITNESSES:
Bernard R. Gieguey
James F. Young

INVENTORS
Emil F. Steinert and
Martin Rebuffoni.
BY
Hyman Diamond.
ATTORNEY

United States Patent Office 3,069,614
Patented Dec. 18, 1962

3,069,614
POWER SUPPLY APPARATUS
Emil F. Steinert and Martin Rebuffoni, Williamsville, N.Y., assignors to Westinghouse Electric Corporation, East Pittsburgh, Pa., a corporation of Pennsylvania
Filed May 11, 1959, Ser. No. 812,547
16 Claims. (Cl. 321—14)

This invention relates to the power supply art and has particular relationship to power supplies for arc welding. Patent 2,965,803, granted December 20, 1960, to Martin Rebuffoni is incorporated in this application by reference.

In its specific aspects, this invention concerns itself wtih arc-welding apparatus in which the power supplied for maintaining the arc is of the direct-current type and is derived through rectifiers of the silicon-diode type. Such diodes have the important advantage that their forward resistance and the ratio of their forward resistance to their back resistance is very low compared to the corresponding properties of other rectifiers such as selenium or copper-oxide rectifiers. The expressions "silicon-diode rectifiers" or "rectifier of the silicon-diode type" as used in this application mean a rectifier which is composed of the element silicon and rectifiers having similar properties composed of other materials than silicon, such as germanium.

When rectifiers of the silicon-diode type are used to supply a load it is necessary, as in the case of rectifiers of other types, that the load be supplied simultaneously through a number of diodes depending on the relationship between the load and the rating of the diodes. But unlike rectifiers of other types the silicon diodes are, as taught by the above-identified Rebuffoni patent, connected as separate rectifier assembly units each unit being supplied from a separate secondary of the supply transformer. Specifically, the requisite number of diodes are connected as separate bridges each bridge being supplied from a separate secondary.

The apparatus disclosed in the above-identified Rebuffoni patent has proved highly satisfactory in use, but in certain situations failures of diodes has been experienced. It has not been found feasible to eliminate or reduce these failures by circuit-breaker operation.

It is then a specific object of this invention to provide arc-welding apparatus in which the power for welding is supplied through silicon-diode rectifiers which shall not suffer from the disadvantages just described.

Another specific object of this invention is to provide highly reliable direct-current arc-welding apparatus of the silicon-diode type which shall operate continuously with a minimum of diode failures and a minimum of overload interruptions.

A more general object of this invention is to provide a novel power supply.

Another general object of this invention is to provide a novel power supply in which the rectification is effected by silicon diodes and which has properties rendering the supply particularly capable of meeting the demands of the silicon diodes.

A further general object of this invention is to provide a novel direct-current power supply of the silicon-diode type which shall operate reliably and continuously particularly in supplying a highly variable load such as a welding arc.

This invention in one of its important aspects arises from the discovery that diode failures are caused by an unbalance in the power supplied by the different rectifier assemblies in the event of a fault in a part of one of the assemblies. Such a fault may be an overload of a diode, a short-circuit of a diode or an open-circuit of a diode. Sometimes a short-circuit and an open-circuit occur in succession. The short-circuit occurs first and then the open-circuit occurs when the conductors are burned away. The failure of one of the diodes in any of the assemblies short-circuiting or open-circuiting or overloading of a diode does not as a rule cause the circuit breaker for the apparatus to open and the apparatus continues to operate and the remaining non-defective assemblies tend to supply the load and become overloaded. This results in excessive overloading of the rectifier units. In accordance with this invention this tendency of failure of one diode to cause a chain reaction which causes overloading and a resulting number of failures is suppressed by interrupting the supply of power to the apparatus on the occurrence of an appreciable unbalance in the power supplied by the different assemblies.

The arc constitutes a highly variable and erratic load on the power supply. Short-circuits and open-circuits occur at frequent intervals and may persist for an unpredictable number of periods of the supply which is usually of the 60 cycle type. This invention in another of its aspects is intimately involved in these properties of the welding arc and arises from the realization that ordinary overload protection for arc-welding apparatus of the silicon-diode type would result either in an excessive number of interruptions of the supply if the interruption takes place for each overload or in severe damage to the diodes if the interruption takes place for an overload of a predetermined short duration. In accordance with this invention the interruption of the power supply is coordinated with the duration of the overload in such a way that the interruption takes place only if the overload persists for a time interval longer than that permissible for the magnitude of the overload.

Apparatus in accordance with the specific aspects of this invention includes a power-supply unit adapted to be connected through a circuit interrupter to an alternating current power source on its input side. The output of this apparatus includes a plurality of rectifier branches or assemblies which are connected to supply the load together. The power-supply unit includes facilities for detecting an unbalance in the power supplied by the branches and also for detecting an overload. The circuit breaker is tripped in response to this detecting means either if an unbalance occurs or if an overload persists for a predetermined time interval which depends inversely on the magnitude of the overload and is shorter than the permissible time for each overload magnitude. Apparatus which embodies these features has been found to operate satisfactorily without excessive failure of diodes or related components and without excessive interruption of its use.

The novel features considered characteristic of this invention are disclosed generally above. The invention itself both as to its organization and as to its method of operation together with additional objects and advantages thereof will be understood from the following description of a specific embodiment taken in connection with the accompanying drawings, in which.

Figure 1:
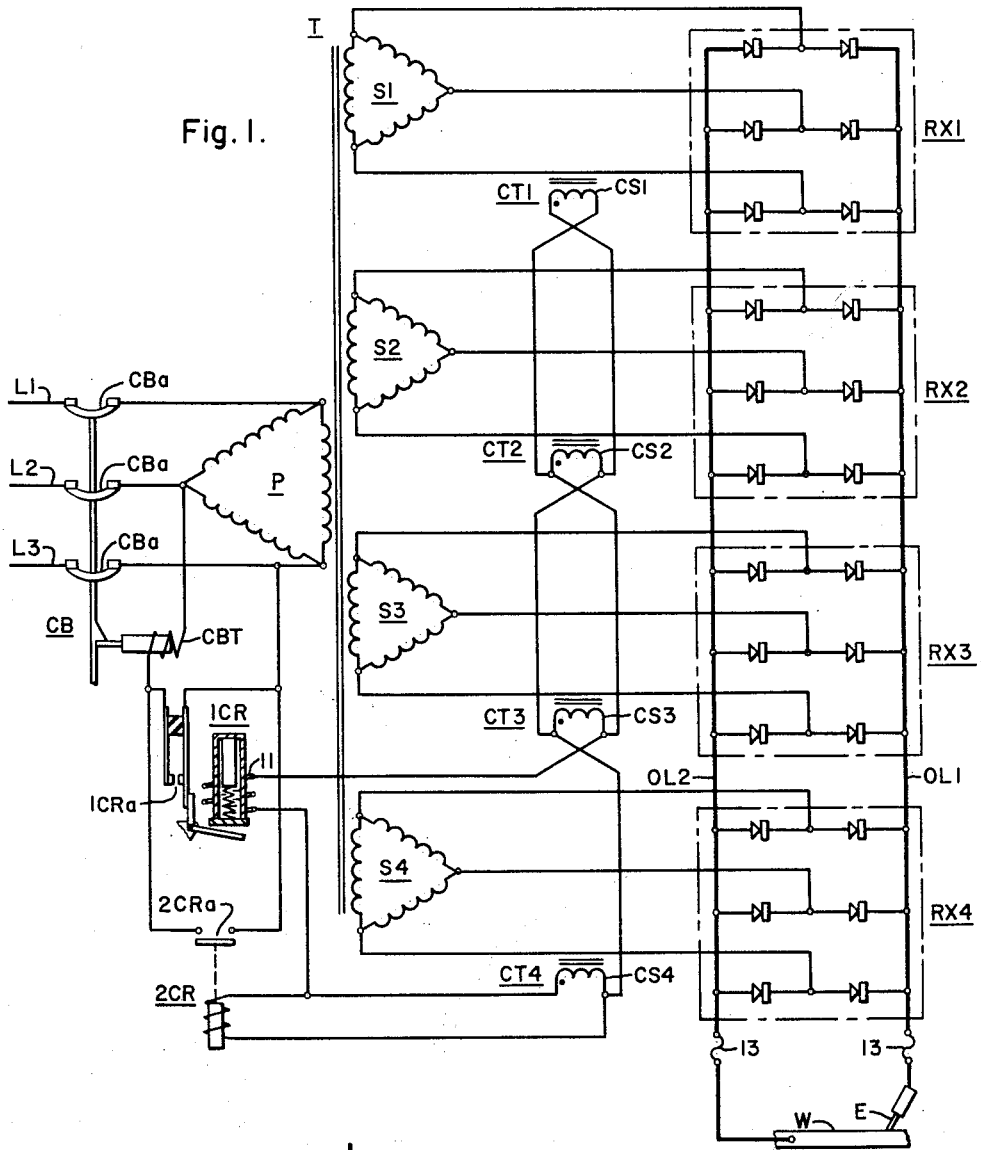
FIG. 1 is a schematic showing of a preferred embodiment of this invention.

The apparatus shown in the drawings includes an arc welder comprising an electrode E and work W. The welder is energized from a direct-current supply including a welding transformer T having a primary P and secondaries S1, S2, S3 and S4. The transformer T is of the polyphase type and its primary P is connected in delta. In accordance with the broader aspects of this invention, the primary may also be connected in star, zig-zag or in any other way. The apparatus is supplied from the buses L1, L2 and L3 of a commercial polyphase supply usually of the 60 cycle 220 or 440 volt type. The apices of the delta are connected respectively to the buses L1, L2 and L3 through the contacts CBa of a circuit breaker CB. The circuit breaker CB has a trip coil CBT which when it is energized, causes the contacts CBa to open. The time taken by the contacts CBa to open following the initiation of trip current through CBT is of the order of less than a period of a 60 cycle supply.

The secondaries S1, S2, S3 and S4 are each connected in delta. In accordance with the broader aspects of this invention, the secondaries may also be connected in star, zig-zag or in any other way. While both the primary P and secondaries S1 through S4 are shown in FIG. 1 to be connected in delta, one may be connected in a network of one type and another in a network of another in accordance with the broader aspects of this invention.

Direct current is derived by connecting a silicon-diode bridge RX1, RX2, RX3, RX4 respectively in rectifying relationship with each secondary S1 through S4. The direct current terminals of the bridges are connected together to common output conductors OL1 and OL2, OL1 being connected to the electrode E and OL2 to the work W.

Frequently a plurality of units as shown in FIG. 1 are connected in parallel to supply a very high load, for example a large number of welders. To preclude damage to one of the parallel units which may have been shorted by the other units high current fuses 13 are interposed in the conductors OL1 and OL2. For example AMTRAP fuses may be used. Such fuses are relatively small and have the facility of responding in a very short time (¼ cycle) to a high overload.

In one of the conductors from each of the secondaries S1 through S4 to the corresponding bridges RX1 through RX4 a current transformer CT1 through CT4 respectively, is coupled. These current transformers have secondary windings CS1 through CS4.

The apparatus also includes relays 1CR and 2CR. Each of these relays has a front contact 1CRa and 2CRa. The relay 2CR is a current relay and operates when a predetermined voltage is impressed on its coil.

The relay 1CR is a current relay the coil 11 of which has a very small impedance. In addition, this relay has the property of operating in a predetermined time interval in dependence upon the current which it is conducting. With this relay 1CR in a load circuit an overload of a predetermined magnitude will cause the relay to operate in a predetermined time interval. The time-current characteristic of the relay is so selected as to correspond to the permissible overload characteristic of the silicon-diodes in the bridges RX1 through RX4.

Figure 3:
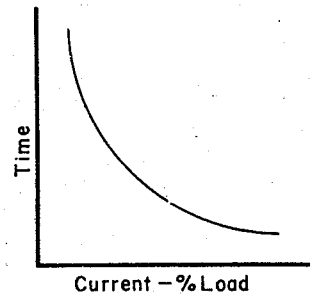
FIG. 3 is a graph showing the time taken by a fault detecting mechanism used in the practice of this invention to operate as a function of the overload.
Figure 2:
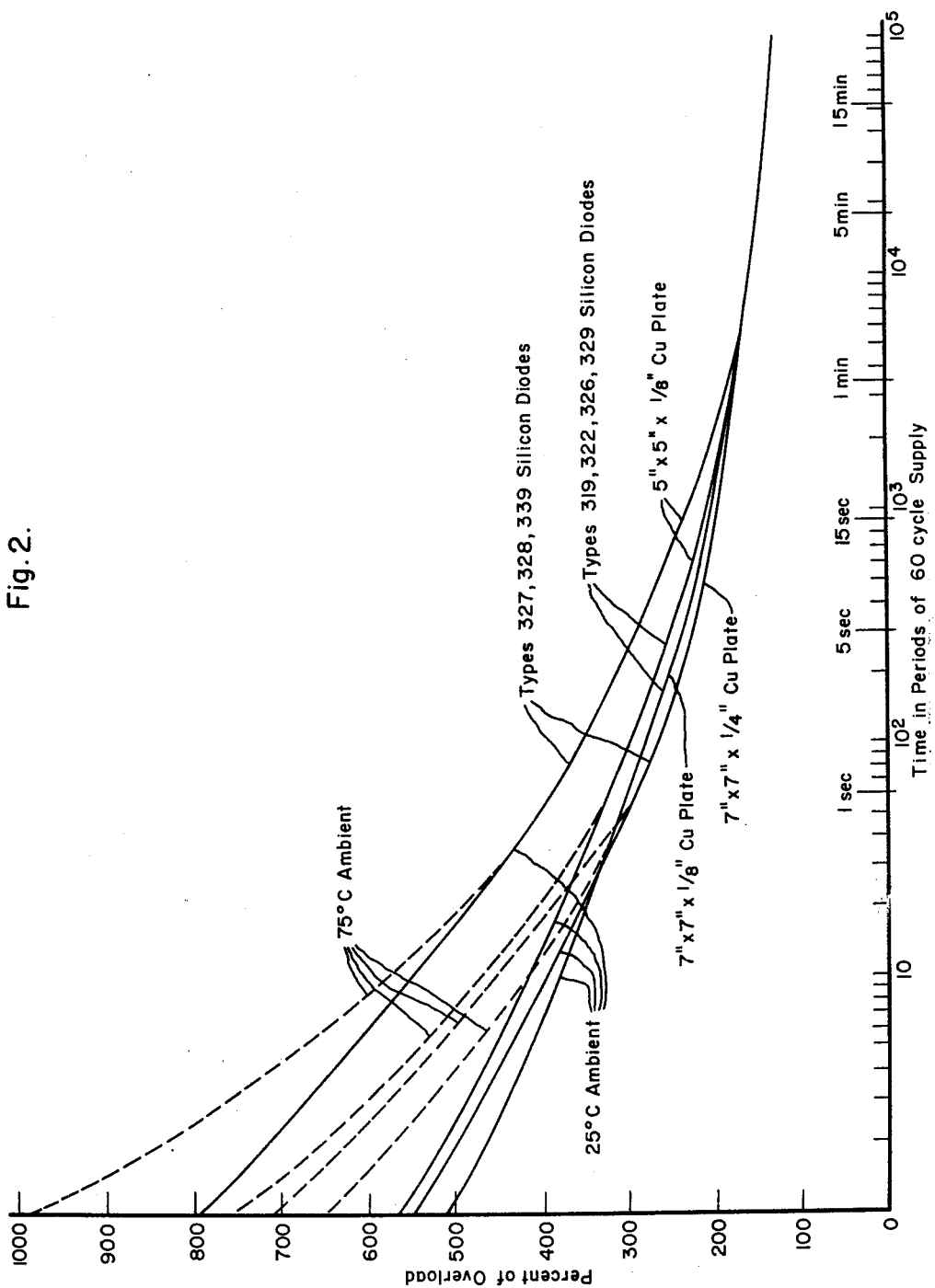
FIG. 2 is a graph showing the permissible overload ratings of a plurality of typical silicon-diodes used in the practice of this invention as a function of the overload duration.

The correlation between the time-current characteristic of relay 1CR and the permissible overload characteristic of the silicon-diodes is illustrated in FIGS. 2 and 3. FIG. 2 is a graph showing the permissible overload characteristics at 25° C. and 75° C. ambient as indicated for types 319, 322, 326, 327, 328, 329 and 339 diodes (as labeled) made by Westinghouse Electric Corporation. Percent of overload rating is plotted vertically and the time during which the diodes may carry this loading both in seconds and in periods of the supply is plotted horizontally. The upper curves as labeled are plotted for operation of the cell with a 5″ x 5″ x ⅛″ copper plate heat sink; the lower curves are plotted for operation of the diode with a 7″ x 7″ x ⅛″ copper plate heat sink. The cells for which the curves are plotted are of the ⅝″ type.

FIG. 3 shows the time-current characteristic of the relay 1CR. Time is plotted vertically and the current supplied to the coil of the relay is plotted horizontally. The time of operation of the relay has a predetermined duration for any current, the time of operation being longer for low currents than for high currents. The relay 1CR is of the type which may be set for any relationship between time and current over a reasonable range.

In accordance with this invention the time-current characteristic of the relay 1CR is made to correspond to the overload-time characteristic of the diodes so that for high overloads the relay would drop out in a correspondingly short time and for low overloads the relay would drop out after a correspondingly longer time. The times are so set that in each case the diodes are not permitted to carry overload current for a time interval greater than the permissible overload time as determinable from curves such as FIG. 2.

The coil 11 of the relay 1CR is connected in series with the windings CS3 and CS4. The coil of the relay 2CR is connected in parallel with the windings CS1, CS2, CS3 and CS4 with the windings CS1 and CS2 connected so that their currents through the coil 2CR oppose and the windings CS3 and CS4 also connected so that their respective currents through this coil oppose. The relay 1CR having a low impedance has substantially no effect on the several parallel circuits.

The trip coil CBT is adapted to be supplied with tripping current from conductors L2 and L3 through the associated contacts CBa of the breaker CB and through contacts 1CRa and 2CRa connected in parallel. With circuit breaker CB closed the closing of either 1CRa or 2CRa causes the circuit breaker to be tripped.

In the operation of the apparatus the circuit breaker CB is closed and a welding arc is produced between the electrode E and the work W. The welding then proceeds with the arc supplied with direct current through the diode bridges RX1 through RX4. The relay 1CR being connected in series with the windings CS3 and CS4 conducts current proportional to the loading of the diodes. As the welding proceeds the load current and the current conducted by the coil 11 of relay 1CR varies sharply. The load current may exceed the rated loading of the diodes by several hundred percent. The coil 11 of the relay 1CR carries overload current during these overloads but remains unactuated so long as the time during which an overload persists is within permissible range as shown in FIG. 2. If the overload persists for longer than permissible time the relay 1CR is actuated closing contact 1CRa and tripping the circuit breaker CB.

The coil of the relay 2CR is supplied with current dependent on the difference of potential produced across the pairs of current transformer windings CS1 and CS2 and CS3 and CS4. So long as the current drawn through bridges RX1, RX2 and RX3 and RX4 are balanced no appreciable current flows through the coil of 2CR. When an unbalance occurs in any bridge for example RX1, there is a corresponding unbalance in the potential produced for example by CS1 and CS2 across the coil 2CR. Current then flows through the coil of 2CR in one direction or the other actuating contact 2CRa and opening the circuit breaker CB. This interrupts operation without causing any damage to the diodes which were sound prior to the occurrence of the fault producing the unbalance.

This invention has been embodied in apparatus and found to operate highly satisfactorily. A typical such embodiment is a power unit having a capacity of 1500 amperes used for multiple-operator arc-welding. This apparatus includes 6 bridges similar to and connected similarly to bridges RX1 through RX4 in which the individual diode cells have a diameter of ½ inch. Each bridge is rated to conduct 310 amperes continuously, the apparatus having a load rating of 2360 amperes. The following table shows the relationship between the loading and the permissible time during which the loading may be supplied.

| Time of Loading | Load Current | Percent of Overload |
| --- | --- | --- |
| 2 minutes | 3,000 | 127 |
| 1 minute | 3,300 | 140 |
| 15 seconds | 3,940 | 167 |
| 1 second | 6,100 | 258 |
| 10 periods | 8,200 | 347 |
| 1 period | 12,000 | 510 |

The above table determines the character of the 1CR relay which is required. The actual relay used in this apparatus is a so-called Silic-O-Netic overload relay made by Heinemann Electric Company of Trenton, New Jersey, and is described in Heinemann Bulletin No. 5103 of September 1957. The relay may be coordinated with the curve corresponding to the above table. Deviations from the curve on the safe side that are not unreasonable are permissible. For example, a relay suitable for the above described apparatus has the following load-time characteristic.

Overload in percent:   Time taken by relay to operate
   125 _____ 40 seconds.
   140 _____ 25 seconds plus or minus 50%.
   350 _____ 3 to 10 cycles.

Apparatus including this relay has been found to operate satisfactorily.

While a preferred embodiment of this invention has been disclosed herein, many modifications thereof are feasible. This invention then is not to be restricted except insofar as is necessitated by the spirit of the prior art.

We claim as our invention:

1. Arc welding apparatus for welding work with a welding electrode with power derived from an alternating-current power supply comprising a welding transformer having a primary and a plurality of pairs of secondaries, circuit interrupting means, means including said interrupting means connected to said primary for connecting said primary in power deriving relationship with said supply, a silicon-diode rectifier assembly connected in power rectifying relationship with each secondary, means connected to said assemblies for connecting said assemblies in direct-current power supply relationship with said electrode and work, means connected to each secondary for deriving a potential dependent on the current conducted by said last-named secondary, means connecting said potential deriving means for each of a pair of said secondaries to the potential deriving means for the other secondary of said last-named pair so that the corresponding derived potentials counteract each other, and means connected to said potential deriving means responsive to an unbalance in the potentials derived by said potential deriving means for any of said pairs of secondaries for opening said circuit interrupting means.

2. Power supply apparatus including a transformer having a primary and at least a first secondary and a second secondary, a silicon-diode rectifier cell assembly connected in rectifying relationship with each said secondary, first means connected to said first secondary for deriving a first potential dependent on the current conducted by said first secondary, second means connected to said second secondary for deriving a second potential dependent on the current conducted by said second secondary, means connected to said transformer when actuated for interrupting the supply of power to said transformer, and means connecting said first and second deriving means to said interrupting means with said first and second potentials in counteracting relationship so that said interrupting means is actuated when there is a substantial difference between said first and second potentials.

3. Power supply apparatus including a transformer having a primary and at least a first secondary and a second secondary, rectifier means connected in rectifying relationship with each said secondary, first means connected to said first secondary for deriving a first potential dependent on the current conducted by said first secondary, second means connected to said second secondary for deriving a second potential dependent on the current conducted by said second secondary, means connected to said transformer when actuated for interrupting the supply of power to said transformer, and means connecting said first and second deriving means to said interrupting means with said first and second potentials in counteracting relationship so that said interrupting means is actuated when there is a substantial difference between said first and second potentials.

4. Power supply apparatus for supplying power from an alternating-current source comprising a transformer having a primary and at least first and second secondaries, first and second rectifier assemblies each of the silicon-diode type connected respectively to said first and second secondaries in rectifying relationship therewith, the permissible magnitude of overload of each said rectifier assembly varying as a predetermined first function of the time interval of overload at said magnitude, circuit interrupting means, means connected to said primary for connecting said primary to said source through said interrupting means with said interrupting means actuable to interrupt the flow of power from said source to said primary, means connected to each said assembly for deriving from each said assembly a potential dependent on the loading of said assembly, means connected to said deriving means for producing a difference potential dependent on the difference between said derived potentials, first means connected to said interrupting means and responsive to said difference potential for actuating said interrupting means when said difference potential is at a predetermined magnitude, and second means responsive to the loading of said assemblies connected to said interrupting means for actuating said interrupting means for an overload of said assemblies persisting for a predetermined time interval, the duration of said last-named time interval varying as a second function of the magnitude of said last-named overload, said second function being substantially the same as said first function.

5. Power supply apparatus for supplying power from an alternating-current source comprising a transformer having a primary and at least a first secondary and a second secondary, a first rectifier assembly of the silicon-diode type connected in rectifying relationship with said first secondary, a second rectifier assembly of the silicon-diode type connected in rectifying relationship with said second secondary, the permissible magnitude of overload of each said assembly varying as a predetermined first function of the time interval of overload at said magnitude circuit interrupting means having a trip coil, first means connected to said first assembly for deriving a first potential dependent on the loading of said first assembly, second means connected to said second assembly for deriving a second potential dependent on the loading of said second assembly, a first relay having a coil and normally open contact means, means connecting said first means, and said second means in parallel with said coil with said first and second potentials opposing, a second relay having a coil and normally open contact means, said second relay being actuable in a time interval which is a second function of the current flowing through said coil of said second relay, said second function being substantially the same as said first function, means connecting said coil of said second relay in series with said first and said second means, conductors for supplying power to energize said trip coil, and means for connecting said trip coil to said conductors through both said normally open contact means in parallel so that said trip coil is energized on the closing of either of said normally open contact means.

6. Apparatus for supplying power from a source to a load comprising a power-supply unit having a plurality of power output branches, circuit interrupting means, means connected to said unit and including said interrupting means for connecting said unit in power-transfer relationship between said source and said load with said branches connected in common to said load and said interrupting means actuable to interrupt the supply of power to said load, means connected to said branches and said interrupting means for actuating said interrupting means on the occurrence of an unbalance in the power supplied by said branches, and means connected to said branches and to said interrupting means for actuating said interrupting means on the persistence of an overload for a time interval dependent on the magnitude of said overload.

7. Apparatus for supplying power from a source to a load comprising a power-supply unit having a plurality of power output branches, circuit interrupting means, means connected to said unit and including said interrupting means for connecting said unit in power-transfer relationship between said source and said load with said branches connected in common to said load and said interrupting means actuable to interrupt the supply of power to said load, means connected to said branches and said interrupting means for actuating said interrupting means on the occurrence of an unbalance in the power supplied by said branches, and means connected to said branches and to said interrupting means responsive to an overload in any of said branches for actuating said interrupting means.

8. Apparatus for supplying power from a source to a load comprising a power-supply unit having a plurality of power output branches, circuit interrupting means, means connected to said unit and including said interrupting means for connecting said unit in power-transfer relationship between said source and said load with said branches connected in common to said load and said interrupting means actuable to interrupt the supply of power to said load, means connected to said branches and said interrupting means for actuating said interrupting means on the occurrence of an unbalance in the power supplied by said branches, and means connected to said branches and to said interrupting means responsive to an overload in any of said branches persisting for at least a predetermined interval which interval depends on the magnitude of said overload for actuating said interrupting means.

9. Apparatus for supplying power from a polyphase source to a load comprising a power-supply unit having a plurality of polyphase branches each of the same phase number as said source, circuit interrupting means, means connected to said unit and including said interrupting means for connecting said unit in power-transfer relationship between said source and said load with said branches connected in common to said load and said interrupting means actuable to interrupt the supply of power to said load, means connected to said branches and said interrupting means for actuating said interrupting means on the occurrence of an unbalance in the power supplied by said branches, and means connected to said branches and to said interrupting means for actuating said interrupting on the persistence of an overload for a time interval dependent on the magnitude of said overload.

10. Apparatus for supplying power from a polyphase source to a load comprising a power-supply unit having a plurality of polyphase branches each of said branches including a rectifying assembly of the silicon-diode type for delivering direct current at its output, circuit interrupting means, means connected to said unit and including said interrupting means for connecting said unit in power-transfer relationship between said source and said load with said branches connected in common to said load and said interrupting means actuable to interrupt the supply of power to said load, and means connected to said branches and said interrupting means for actuating said interrupting means on the occurrence of an unbalance in the power supplied by said branches.

11. Power supply apparatus including a transformer having a primary and at least a first secondary and a second secondary, a silicon-diode rectifier cell assembly connected in rectifying relationship with each said secondary, first means connected to said first secondary for deriving a first potential dependent on the current conducted by said first secondary, second means connected to said second secondary for deriving a second potential dependent on the current conducted by said second secondary, and means connected to said first and second deriving means responsive to a substantial difference between said first and second potentials for interrupting the currents producing said first and second potentials.

12. Apparatus for supplying power from a polyphase source to a load comprising a power-supply unit having a plurality of polyphase branches each of the same phase number as said source, each branch including a plurality of conductors corresponding in number to the phase number of said source, circuit interrupting means, means connected to said unit and including said interrupting means for connecting said unit in power-transfer relationship between said source and said load with said branches connected in common to said load and said interrupting means actuable to interrupt the supply of power to said load, and means connected only to one conductor of each of said branches and to said interrupting means for actuating said interrupting means on the occurrence of an unbalance in the power supplied by said branches.

13. Apparatus for supplying power from a polyphase source to a load comprising a power-supply unit having a plurality of polyphase branches each of the same phase number as said source, each branch including a plurality of conductors corresponding in number to the phase number of said source and a silicon-diode bridge connected in rectifying relationship with each of said branches, circuit interrupting means, means connected to said unit and including said interrupting means for connecting said unit in direct-current power-transfer relationship between said source and said load with said branches connected in common to said load and said interrupting means actuable to interrupt the supply of power to said load, and means connected only to one conductor of each of said branches and to said interrupting means for actuating said interrupting means on the occurrence of an unbalance in the power supplied by said branches.

14. Arc welding apparatus for welding work with a welding electrode with power derived from an alternating current supply comprising silicon-diode rectifier means, the permissible magnitude of overload of said rectifier means varying as a predetermined first function of the time interval of overload at said magnitude, circuit interrupting means, means connected to said rectifier means and to said interrupting means for connecting said rectifier means to said supply through said interrupting means with said interrupting means actuable to interrupt the supply of power to said rectifier means, means connected to said rectifier means for connecting said rectifier means in direct-current power supply relationship with said electrode and work, means connected to said rectifier means responsive to an overload in said rectifier means to actuate said interrupting means if said overload persists for a predetermined second time interval, the duration of said second interval varying as a second function of the magnitude of said last-named overload, said second function being substantially the same as said first function.

15. Apparatus for supplying direct current to a load comprising silicon-diode rectifier means, the permissible magnitude of overload of said rectifier means varying as a predetermined first function of the time interval of overload at said magnitude, circuit interrupting means, means connected to said rectifier means and to said interrupting means for connecting said rectifier means to said supply through said interrupting means with said interrupting means actuable to interrupt the supply of power to said rectifier means, means connected to said rectifier means for connecting said rectifier means in direct-current power supply relationship with said load, means connected to said rectifier means responsive to an overload in said rectifier means to actuate said interrupter means if said overload persists for a predetermined second time interval, the duration of said second interval varying as a second function of the magnitude of said last-named overload, said second function being substantially the same as said first function.

16. Apparatus for supplying power from a polyphase source to a load comprising a power-supply unit having a plurality of polyphase branches each of the same phase number as said source and each including a rectifying network of the silicon-diode type, circuit interrupting means, means connected to said unit and including said interrupting means for connecting said unit in power-transfer relationship between said source and said load with said branches connected in parallel to said load and said interrupting means actuable to interrupt the supply of power to said load, the load current flowing through said parallel branches, and means connected to said branches and said interrupting means for actuating said interrupting means on the occurrence of an unbalance in the power supplied by said branches.

References Cited in the file of this patent

UNITED STATES PATENTS

| | | |
|---|---|---|
| 1,594,116 | Ricketts | July 27, 1926 |
| 1,888,718 | Friedlander | Nov. 22, 1932 |
| 2,259,331 | Vedder | Oct. 14, 1941 |
| 2,289,149 | Sonnemann | July 7, 1942 |
| 2,309,433 | Anderson | Jan. 26, 1943 |
| 2,386,526 | Whitesell et al. | Oct. 9, 1945 |
| 2,576,132 | Marbury | Nov. 27, 1951 |
| 2,813,243 | Christian et al. | Nov. 12, 1957 |
| 2,828,461 | Pokorny | Mar. 25, 1958 |
| 2,866,147 | Bichsel | Dec. 23, 1958 |
| 2,888,613 | Cuttino | May 26, 1959 |